Patented Jan. 30, 1951

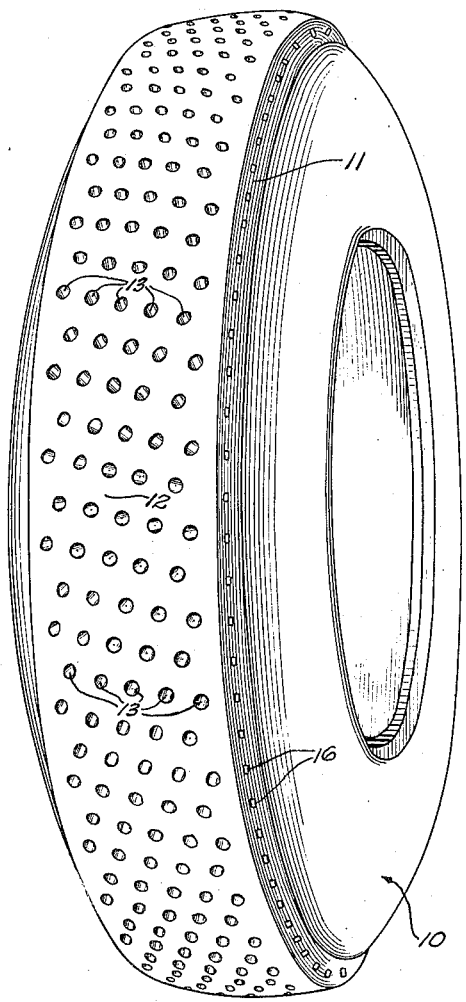
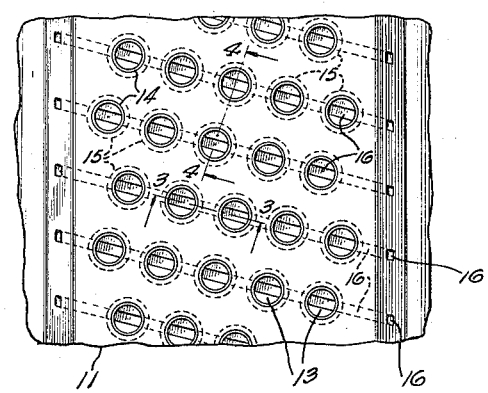
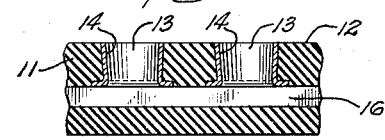
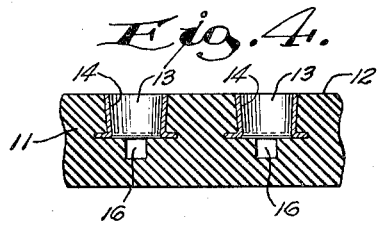
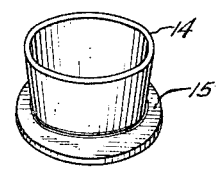

2,540,045

UNITED STATES PATENT OFFICE 2,540,045

NONSKID RUBBER TRACTION MEMBER

David E. Crooker, Ontonagon, Mich., assignor of one-half to Lloyd L. Felker, Marshfield, Wis.

Application October 1, 1948, Serial No. 52,200

3 Claims. (Cl. 152—211)

This invention relates to improvements in non-skid rubber traction members, and more particularly, but not exclusively, to vehicle tires.

It is recognized that there is a definite need for traction members, particularly automobile tires used in northern climates, which are constructed to provide adequate traction on icy streets or in other places where conventional tires fail to grip and are for that reason unsafe. Various types of tire constructions have heretofore been proposed some of which have elongated wire coils of one kind or another embedded therein beneath the tread surface. The size of the wire used in this type of tire is limited because of the necessity of retaining the inherently flexible qualities of the conventional tire. Furthermore, the efficiency of wire coil embedded tires varies with the amount of wear to which the tire has been subjected and therefore a "wearing in" period must be gone through prior to the attainment of peak road-gripping efficiency.

It is therefore a general object of the invention to provide an improved non-skid tire construction having a large number of indiidual traction augmenting members embedded in the tread thereof.

A further object of the invention is to provide a non-skid tire construction which requires no "wearing in" period prior to the attainment of peak road-gripping efficiency, and which has substantially the same road gripping qualities during its entire useful life.

A further object of the invention is to provide a non-skid tire construction in which the traction augmenting members may be made of any desired gauge metal without affecting the flexibility of the tire tread.

A further object of the invention is to provide a non-skid tire construction which is applicable during original tire manufacture or during a retreading operation.

A more specific object of the invention is to provide a non-skid tire construction wherein traction augmenting members in the form of flanged metal sleeves are embedded in the tire tread.

A further object of the invention is to provide a tire construction of the class described having a tread surface formed with a plurality of metal lined, cup-shaped recesses which communicate at their inner ends with transverse ventilating passages.

A further object of the invention is to provide a tire construction of the class described wherein the metal sleeves therein aid in cooling the tire by speeding up the rate of heat transfer from the interior of the tire to the cooling air which is forced through the ventilating passages.

With these and other objects in view, the invention consists of the improved non-skid tire construction, and all of its parts and combinations, as set forth in the claims, and all equivalents thereof.

In the drawing accompanying and forming a part of this specification, wherein is shown one complete embodiment of the preferred form of the invention, and wherein the same reference characters indicate the same parts in all of the views:

Fig. 1 is a perspective view of the improved tire;

Fig. 2 is an enlarged fragmentary plan view of the tread of the improved tire;

Fig. 3 is a fragmentary transverse vertical sectional view of the improved tire tread taken along the line 3—3 of Fig. 2;

Fig. 4 is a fragmentary longitudinal sectional view of the improved tire tread taken along the line 4—4 of Fig. 2; and Fig. 5 is a perspective side view, on an enlarged scale, of one of the flanged-sleeve traction augmenting members alone.

Referring to the drawing, the numeral 10 indicates a tire embodying the improved non-skid construction. The tire 10 has a tread 11 which is preferably of substantially the same height as the tread of conventional tires, and which may have a substantially smooth road contacting surface 12.

The tread 11 is formed with a plurality of preferably circular recesses 13 which extend radially inwardly with respect to the axis of rotation of the tire as shown in Fig. 1. The recesses 13 are preferably arranged in transversely extending oblique rows.

Each of the recesses 13 is lined with a metal sleeve 14 having an annular flange 15 projecting laterally from one end thereof. Referring to Figs. 3 and 4, the sleeves 14 are embedded in the tread 11 with the unflanged ends thereof flush with the tread surface 12 and with the flanged end thereof positioned radially inwardly therefrom with respect to the axis of rotation of the tire. The flange 15 on each sleeve 14 securely holds the sleeve in embedded position, thereby preventing its removal from the tire.

The sleeves 14 may be made of any suitable material and this material may be of any suitable gauge. Sleeves made of high grade steel having good wear resisting qualities are preferred. It will be noted that regardless of the gauge of metal used in the sleeves 14, the flexibility of the tire tread is substantially unaffected, because there is no connection between any of the adjacent sleeves. In tires having metal coils embedded therein for traction augmenting purposes, a heavy gauge coil would destroy the flexibility of the tire.

The improved non-skid tire may be made with a transverse passage 16 underlying the surface 12 and in line with each of the rows of apertures 13. The passage 16 is in communication with all of the apertures 13 in the row with which it is aligned. This is in accordance with the construction shown in my copending application, Serial No. 46,909. Whether or not the passages 16 are embodied in the improved tire, the metal sleeves, because of their relatively good heat conducting properties greatly aid in dissipating the heat which is normally generated within the tire during use.

When the tire 10 is in operation, the ends of the sleeves 14, which are normally flush with the tread surface 12, are forced outwardly and dig into the roadbed, thereby greatly augmenting the traction of the tire. The tire 10 will operate at peak efficiency when new, and will continue to so operate during substantially all of its useful life. It requires no "wearing in," as is true of many types of non-skid tire constructions. This is because the sleeves 14 will present substantially the same circular road gripping edge to the roadbed regardless of whether the tire 10 is new or worn. The road gripping action of the improved metal sleeve traction members is entirely different from that of conventional non-skid tires in that during use, the individual sleeves are not subject to deformation because of their shape or composition. In coil embedded tires, the coils wear into a plurality of segments, each of which is subject to deformation.

While the invention has been shown in the form of a vehicle tire, this is for the purpose of illustration only and is not intended to impose unecessary limitations on the claims, or to confine the invention to this particular use. The improved non-skid construction is readily applicable to other articles where non-skid traction members are needed, and all of such applications are contemplated as may come within the scope of the claims.

I claim:

1. In a rubber traction member: a rubber tread portion integral therewith and formed with a plurality of recesses in the wearing surface thereof, said tread portion also being formed with a plurality of open ended ventilating passages underlying said tread surface, said recesses being in communication with said passages; and hollow, open bottomed metal sleeves positioned in and lining the sidewalls of said recesses, said sleeves each having one end substantially flush with said tread surface.

2. In a rubber traction member: a rubber tread portion integral therewith and formed with a plurality of recesses in the wearing surface thereof, said recesses being disposed in obliquely extending transverse rows, and said tread also being formed with a plurality of open ended ventilating passages underlying said tread surface, each of said passages being aligned with one of said rows and extending from one edge of said tread portion to the other; and hollow metal sleeves positioned in and lining the sidewalls of said recesses, each sleeve having one of its ends substantially flush with said tread surface and having it other end in communication with the ventilating passage therebelow.

3. In a rubber traction member: a rubber tread portion integral therewith and formed with a plurality of recesses in the wearing surface thereof, said recesses being disposed in obliquely extending transverse rows, and said tread also being formed with a plurality of open ended ventilating passages underlying said tread surface, each of said passages being aligned with one of said rows and extending from one edge of said tread portion to the other; and hollow metal sleeves positioned in and lining the sidewalls of said recesses, each sleeve having one of its ends substantially flush with said tread surface and having its other end formed with a laterally outwardly projecting annular flange, said flanged end being positioned in communication with the ventilating passage therebelow.

DAVID E. CROOKER.

REFERENCES CITED

The following references are of record in the file of this patent:

UNITED STATES PATENTS

| Number | Name | Date |
| --- | --- | --- |
| 849,729 | Dunbar | Apr. 9, 1907 |
| 2,121,956 | Eger | June 28, 1938 |
| 2,424,647 | Bernkull | July 29, 1947 |